(12) United States Patent
Muravev et al.

(10) Patent No.: US 12,429,701 B2
(45) Date of Patent: Sep. 30, 2025

(54) AUGMENTED REALITY DEVICE BASED ON CURVED WAVEGUIDE, METHOD THEREFOR, AUGMENTED REALITY GLASSES BASED ON SAID DEVICE

(71) Applicant: Samsung Electronics Co., Ltd., Suwon-si (KR)

(72) Inventors: Nikolay Viktorovich Muravev, Podolsk (RU); Aleksandr Evgenyevich Angervaks, St. Petersburg (RU); Gavril Nikolaevich Vostrikov, Moscow (RU); Jaeyeol Ryu, Suwon-si (KR); Anastasia Sergeevna Perevoznikova, Moscow (RU); Vladimir Nikolaevich Borisov, St. Petersburg (RU); Roman Aleksandrovich Okun, St. Petersburg (RU); Kyusub Kwak, Suwon-si (KR); Jeonggeun Yun, Suwon-si (KR); Jongchul Choi, Suwon-si (KR); Myongjo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 444 days.

(21) Appl. No.: 17/982,009

(22) Filed: Nov. 7, 2022

(65) Prior Publication Data

US 2023/0185101 A1 Jun. 15, 2023

(30) Foreign Application Priority Data

Dec. 13, 2021 (RU) .......................... RU2021136758

(51) Int. Cl.
*G02B 27/09* (2006.01)
*G02B 27/01* (2006.01)
(Continued)

(52) U.S. Cl.
CPC ..... *G02B 27/0944* (2013.01); *G02B 27/0172* (2013.01); *G02B 27/18* (2013.01);
(Continued)

(58) Field of Classification Search
CPC ...... G02B 2027/011; G02B 2027/0116; G02B 2027/0174; G02B 2027/0178; G02B 27/0172
See application file for complete search history.

(56) References Cited

U.S. PATENT DOCUMENTS 4,126,136 A 11/1978 Auth et al.
4,159,793 A 7/1979 Belmonte et al.
(Continued)

FOREIGN PATENT DOCUMENTS

CN 1082201 A 2/1994
CN 1111768 A 11/1995
(Continued)

OTHER PUBLICATIONS

Russian Search Report dated Aug. 24, 2022, issued in Russian Patent Application No. 2021136758.
(Continued)

*Primary Examiner* — Alexander P Gross
(74) *Attorney, Agent, or Firm* — Jefferson IP Law, LLP

(57) ABSTRACT

The disclosure relates to augmented reality devices based on a curved waveguide. An augmented reality device is provided. The augmented reality device includes a projection system to project an undistorted image, an input optical compensator located on the path of light rays out-coupled from the projection system, a curved waveguide comprising an input diffractive optical element and an output diffractive optical element. The output diffractive optical element performs the function of an output optical compensator that converts the light beams of a distorted image at the output
(Continued)

of the waveguide into parallel light beams to output an undistorted image. Augmented reality glasses comprising an augmented reality device are also proposed. There is provided the ability to project a virtual image without aberrations, distortions and doubling of the image.

18 Claims, 11 Drawing Sheets

(51) Int. Cl.
  *G02B 27/18* (2006.01)
  *G06T 19/00* (2011.01)
(52) U.S. Cl.
  CPC ...... *G06T 19/006* (2013.01); *G02B 2027/011* (2013.01); *G02B 2027/0116* (2013.01); *G02B 2027/0178* (2013.01)

(56) References Cited

U.S. PATENT DOCUMENTS

| | | |
|---|---|---|
| 5,399,868 A | 3/1995 | Jones et al. |
| 5,870,417 A | 2/1999 | Verdiell et al. |
| 5,883,991 A | 3/1999 | Funabashi |
| 5,889,911 A | 3/1999 | Herve |
| 6,430,346 B1 | 8/2002 | Conradi et al. |
| 6,614,960 B2 | 9/2003 | Berini |
| 6,637,882 B1 | 10/2003 | Goldfain et al. |
| 6,665,321 B1 | 12/2003 | Sochava et al. |
| 6,697,541 B1 | 2/2004 | Chen et al. |
| 6,829,412 B2 | 12/2004 | Li |
| 6,836,357 B2 | 12/2004 | Wang et al. |
| 6,898,353 B2 | 5/2005 | Li |
| 7,020,368 B2 | 3/2006 | Li |
| 7,123,795 B2 | 10/2006 | Savard |
| 7,151,874 B2 | 12/2006 | Li |
| 7,236,660 B2 | 6/2007 | Ducellier et al. |
| 7,672,213 B2 | 3/2010 | Van Brocklin et al. |
| 7,728,959 B2 | 6/2010 | Waldman et al. |
| 7,879,598 B2 | 2/2011 | Zesch et al. |
| 8,311,377 B2 | 11/2012 | Levner et al. |
| 8,761,549 B2 | 6/2014 | Rasigade et al. |
| 8,891,910 B2 | 11/2014 | Dell'Orto et al. |
| 8,951,779 B2 | 2/2015 | Yoo |
| 9,106,050 B2 | 8/2015 | Yan |
| 9,348,143 B2 | 5/2016 | Gao et al. |
| 9,740,006 B2 | 8/2017 | Gao |
| 9,880,342 B2 | 1/2018 | Vasylyev |
| 9,891,364 B2 | 2/2018 | Tissot |
| 9,897,811 B2 | 2/2018 | Martinez et al. |
| 10,002,215 B2 | 6/2018 | Dowski et al. |
| 10,067,293 B2 | 9/2018 | Menard et al. |
| 10,108,014 B2 | 10/2018 | Vallius et al. |
| 10,168,247 B2 | 1/2019 | Frigo et al. |
| 10,297,634 B2 | 5/2019 | Yu et al. |
| 10,529,138 B2 | 1/2020 | Schowengerdt |
| 10,545,346 B2 | 1/2020 | Waldern et al. |
| 10,844,516 B2 | 11/2020 | Fratello |
| 10,983,346 B2 | 4/2021 | Vallius et al. |
| 10,985,842 B2 | 4/2021 | Schrenk |
| 11,169,324 B2 | 11/2021 | Zhang et al. |
| 11,410,384 B2 | 8/2022 | Blackley et al. |
| 2001/0025190 A1 | 9/2001 | Weber et al. |
| 2002/0085594 A1 | 7/2002 | Pezeshki et al. |
| 2002/0182631 A1 | 12/2002 | Schurmann-Mader et al. |
| 2003/0021530 A1 | 1/2003 | Li |
| 2003/0067676 A1 | 4/2003 | Wang et al. |
| 2003/0148542 A1 | 8/2003 | Pawlak et al. |
| 2003/0169787 A1 | 9/2003 | Vurgaftman et al. |
| 2004/0038386 A1 | 2/2004 | Zesch et al. |
| 2004/0252938 A1 | 12/2004 | Ducellier et al. |
| 2005/0018734 A1 | 1/2005 | Sugitatsu et al. |
| 2005/0047723 A1 | 3/2005 | Li |
| 2005/0111079 A1 | 5/2005 | Wang et al. |
| 2005/0238301 A1 | 10/2005 | Russell et al. |
| 2006/0051022 A1 | 3/2006 | Levner et al. |
| 2006/0110105 A1 | 5/2006 | Savard et al. |
| 2006/0133732 A1 | 6/2006 | Li |
| 2006/0193592 A1 | 8/2006 | McNie et al. |
| 2007/0196047 A9 | 8/2007 | Levner et al. |
| 2008/0123908 A1 | 5/2008 | Waldman et al. |
| 2011/0144729 A1 | 6/2011 | Weber |
| 2012/0162549 A1 | 6/2012 | Gao et al. |
| 2012/0183251 A1 | 7/2012 | Rasigade et al. |
| 2013/0066150 A1 | 3/2013 | Lee et al. |
| 2013/0267786 A1 | 10/2013 | Vayser et al. |
| 2015/0234458 A1* | 8/2015 | Hsieh .................... B60K 35/60 |
| | | 345/156 |
| 2016/0097890 A1 | 4/2016 | Vasylyev |
| 2016/0154245 A1 | 6/2016 | Gao et al. |
| 2017/0017043 A1 | 1/2017 | Menard et al. |
| 2017/0095667 A1 | 4/2017 | Yakovlev et al. |
| 2017/0336639 A1 | 11/2017 | Gao et al. |
| 2018/0188542 A1 | 7/2018 | Waldern et al. |
| 2018/0196263 A1 | 7/2018 | Vallius et al. |
| 2018/0231784 A1 | 8/2018 | Koudsi et al. |
| 2019/0072767 A1* | 3/2019 | Vallius .................. H04N 9/646 |
| 2019/0179409 A1 | 6/2019 | Jones et al. |
| 2020/0032747 A1 | 1/2020 | Gobbato et al. |
| 2020/0139151 A1 | 5/2020 | Lundmark et al. |
| 2020/0280164 A1 | 9/2020 | Almeida et al. |
| 2020/0326491 A1 | 10/2020 | Psaila et al. |
| 2020/0343977 A1 | 10/2020 | Schrenk |
| 2020/0379260 A1 | 12/2020 | Blomstedt |
| 2021/0003267 A1 | 1/2021 | Haigh |
| 2022/0128828 A1 | 4/2022 | Rothberg et al. |
| 2022/0137300 A1 | 5/2022 | Li et al. |
| 2022/0244439 A1 | 8/2022 | Tekolste et al. |
| 2022/0326538 A1 | 10/2022 | Dong et al. |
| 2023/0384598 A1* | 11/2023 | Volkov ............... G02B 27/0081 |

FOREIGN PATENT DOCUMENTS

| | | |
|---|---|---|
| CN | 1328431 A | 12/2001 |
| CN | 1384924 A | 12/2002 |
| CN | 1391656 A | 1/2003 |
| CN | 1521974 A | 8/2004 |
| CN | 2711757 Y | 7/2005 |
| CN | 1649801 A | 8/2005 |
| CN | 1656721 A | 8/2005 |
| CN | 1227548 C | 11/2005 |
| CN | 1692295 A | 11/2005 |
| CN | 1860391 A | 11/2006 |
| CN | 1864354 A | 11/2006 |
| CN | 101014307 A | 8/2007 |
| CN | 100376908 C | 3/2008 |
| CN | 100383585 C | 4/2008 |
| CN | 101389956 A | 3/2009 |
| CN | 101473439 A | 7/2009 |
| CN | 102360149 A | 2/2012 |
| CN | 102608696 A | 7/2012 |
| CN | 102756805 A | 10/2012 |
| CN | 202757044 U | 2/2013 |
| CN | 102360149 B | 6/2013 |
| CN | 103454067 A | 12/2013 |
| CN | 103587128 A | 2/2014 |
| CN | 103635839 A | 3/2014 |
| CN | 103688208 A | 3/2014 |
| CN | 103891066 A | 6/2014 |
| CN | 104216047 A | 12/2014 |
| CN | 104459886 A | 3/2015 |
| CN | 102840869 B | 4/2015 |
| CN | 104737061 A | 6/2015 |
| CN | 103454067 B | 8/2015 |
| CN | 103587128 B | 10/2015 |
| CN | 105142529 A | 12/2015 |
| CN | 105182470 A | 12/2015 |
| CN | 105590942 A | 5/2016 |
| CN | 105929545 A * | 9/2016 ............ G02B 27/00 |
| CN | 105934902 A | 9/2016 |
| CN | 103261961 B | 2/2017 |
| CN | 104459886 B | 3/2017 |
| CN | 106707412 A | 5/2017 |

(56) References Cited

FOREIGN PATENT DOCUMENTS

| | | |
|---|---|---|
| CN | 103688208 B | 6/2017 |
| CN | 206224056 U | 6/2017 |
| CN | 106990479 | 7/2017 |
| CN | 107315249 A | 11/2017 |
| CN | 107528106 A | 12/2017 |
| CN | 104737061 B | 1/2018 |
| CN | 102756805 B | 2/2018 |
| CN | 108711369 A | 10/2018 |
| CN | 108884980 A | 11/2018 |
| CN | 105590942 B | 12/2018 |
| CN | 109613656 A | 4/2019 |
| CN | 106125324 B | 5/2019 |
| CN | 109758108 A | 5/2019 |
| CN | 106707412 B | 6/2019 |
| CN | 109923245 A | 6/2019 |
| CN | 110088667 A | 8/2019 |
| CN | 110265854 A | 9/2019 |
| CN | 110579227 A | 12/2019 |
| CN | 107219628 B | 5/2020 |
| CN | 108415122 B | 5/2020 |
| CN | 111373614 A | 7/2020 |
| CN | 111602026 A | 8/2020 |
| CN | 109613656 B | 10/2020 |
| CN | 112129438 A | 12/2020 |
| CN | 112204457 A | 1/2021 |
| CN | 112684529 A | 4/2021 |
| CN | 112737683 A | 4/2021 |
| CN | 112823307 A | 5/2021 |
| CN | 112987176 A | 6/2021 |
| CN | 113075766 A | 7/2021 |
| EP | 1 244 390 B1 | 8/2006 |
| EP | 1 327 135 B1 | 2/2010 |
| EP | 2 859 403 B1 | 10/2022 |
| IN | 109739061 A | 5/2019 |
| WO | 96/07118 A2 | 3/1996 |
| WO | 01/49194 A2 | 7/2001 |
| WO | 02/37621 A2 | 5/2002 |
| WO | 03/010568 A1 | 2/2003 |
| WO | 03/050584 A1 | 6/2003 |
| WO | 03/076976 A2 | 9/2003 |
| WO | 03/098856 A2 | 11/2003 |
| WO | 2004/003598 A2 | 1/2004 |
| WO | 2005/001753 A1 | 1/2005 |
| WO | 2008/020899 A2 | 2/2008 |
| WO | 2012/088478 A1 | 6/2012 |
| WO | 2013/044151 A1 | 3/2013 |
| WO | 2015/081313 A2 | 6/2015 |
| WO | 2015/081313 A9 | 6/2015 |
| WO | 2015/196164 A2 | 12/2015 |
| WO | 2017/155593 A2 | 9/2017 |
| WO | 2018/129398 A1 | 7/2018 |
| WO | 2018/185489 A1 | 10/2018 |
| WO | 2019/075631 A1 | 4/2019 |
| WO | 2019/104413 A1 | 6/2019 |
| WO | 2019/122914 A1 | 6/2019 |
| WO | 2019/143729 A1 | 7/2019 |
| WO | 2019/144903 A1 | 8/2019 |
| WO | 2020/232170 A1 | 11/2020 |
| WO | 2021/098374 A1 | 5/2021 |
| WO | 2021/112997 A1 | 6/2021 |

OTHER PUBLICATIONS

Russian Decision on Grant dated Aug. 25, 2022, issued in Russian Patent Application No. 2021136758.

\* cited by examiner

AUGMENTED REALITY DEVICE BASED ON CURVED WAVEGUIDE, METHOD THEREFOR, AUGMENTED REALITY GLASSES BASED ON SAID DEVICE

CROSS-REFERENCE TO RELATED APPLICATION(S)

This application is based on and claims priority under 35 U.S.C. § 119(a) of of a Russian application number 2021136758, filed on Dec. 13, 2021, in the Russian Intellectual Property Office, the disclosure of which is incorporated by reference herein in its entirety.

BACKGROUND

1. Field

The disclosure relates to augmented reality devices. More particularly, the disclosure relates to augmented reality glasses and methods therefor.

2. Description of Related Art

Wearable augmented reality (AR) glasses are a personal device that can be used as an additional screen, for example for smartphones or other electronic devices. Mass consumers need AR devices with a wide field of view ((FOV)—angular characteristic showing in what range of angles virtual images can be observed), low weight and cost, compactness and high resolution, such wearable devices can replace television (TV) and smartphones for the user. At this stage of the art, the maximum width of the field of view is 600 diagonally.

The following features are imposed on augmented reality glasses systems:
- a wide field of view so that a human eye can cover the entire area that it sees, the ability to overlay virtual images over a large area;
- good image quality, high resolution, high contrast, etc.;
- low weight;
- compactness;
- low cost.

It should be noted that augmented reality glasses require unification in mass production, since anthropometric data of each person is individual, therefore the aesthetics and ergonomics of augmented reality glasses require individual parameters of the waveguide, in particular, the radius of curvature. Different curvature of the waveguide has a different effect on the homocentricity of the beams in the waveguide and at its output. When such requirements are achieved, there are problems associated, for example, with the fact that a wide field of view requires a wide area within which the eye can see the entire image without loss.

Wearable augmented reality (AR) glasses are a personal device that can be used as an additional screen, for example for smartphones or other electronic devices. Mass consumer needs AR devices with a wide field of view (FOV)—angular characteristic showing in what range of angles virtual images can be observed), low weight and cost, compactness and high resolution, such wearable devices can replace TV and smartphones for the user. At this stage of the art, the maximum width of the field of view is 600 diagonally.

Currently, the technology of manufacturing augmented reality devices based on planar waveguides with diffractive optical elements is used. Such devices are light in weight, small in size, low in cost, can provide a wide field of view, a wide eye motion box, high transmission, that is, high transmission of a real image.

Augmented reality glasses based on planar waveguides, that is, waveguides that are a plate with two plane-parallel surfaces, are widely used. However, the edges with the image projectors thereon are located in such devices far from the temporal part of the user's head, therefor such glasses occupy a large space in use.

Curved waveguides are also used, which go around the circumference of the user's head, such glasses are more compact and comfortable, have less weight, smaller dimensions, the device is more ergonomic and aesthetic. However, a curved waveguide adds distortion to the image.

When a parallel beam is incident on a curved waveguide, the light is coupled into the waveguide using an input diffraction grating. A beam of rays from a beam with a plane wavefront, in which the rays propagate parallel to each other, turns into a beam with a spherical wavefront, where the rays converge at a certain point, wherein the wavefront curves differently with different curvature, so the image becomes distorted. This effect shall be taken into account and compensated for in the manufacture of augmented reality glasses from curved waveguides.

Document WO 2020232170 A1 (publication date 19 Nov. 2020) discloses a light combiner employing a curved waveguide system. The device includes a spatially-curved waveguide-body complemented with holographic layers disposed on the surface of the waveguide-body to couple light into the waveguide-body and outcouple light from the waveguide body to form an optical image by the curved waveguide-body. The holographic diffraction elements have different diffraction efficiencies. At least one of the holographic layers is configured to operate as an optical power lens element. The drawback of this system is small Eye motion box (EMB), doubling as the field of view increases.

Document US 2019/0072767 A1 (publication date 7 Mar. 2019) discloses a display apparatus including curved waveguide, wherein a light-incoupling portion of the waveguide is flat while a light-outcoupling portion of the waveguide is curved. On the curved portion of the waveguide there is a varying period output-grating, wherein the whole light that has been in-coupled into the waveguide from the projector is out-coupled through the output-grating at one angle, that is, all the beams output from the waveguide are parallel to each other, so that the image has no distortions. The drawback of the device is that it can operate only with a narrow beam coming out of the projector.

Thus, a need arose to develop an easy-to-manufacture, compact and convenient device with a curved waveguide for displaying augmented reality for augmented reality glasses with a wide field of view and a large eye motion box.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an augmented reality device based on curved waveguide, method therefor, and augmented reality glasses based on said device.

Additional aspects will be set forth in part in the description which follows and, in part, will be apparent from the description, or may be learned by practice of the presented embodiments.

In accordance with an aspect of the disclosure, an augmented reality device is provided. The device includes a projection system, an input optical compensator located on the path of light rays out-coupled from the projection system, a curved waveguide containing an input diffractive optical element and an output diffractive optical element, wherein, the projection system is configured to project an undistorted image as parallel light rays onto the input optical compensator, the input optical compensator is configured to pre-distort the image obtained from the projection system, wherein the image pre-distortion is opposite to that which would be introduced by a curved waveguide into an undistorted image, wherein, the input diffractive optical element is configured to input, into the curved waveguide, an image with a pre-distortion opposite to the distortion introduced by the curved waveguide, the output diffractive optical element is configured with a variable period of the diffraction grating and performs the function of an output optical compensator that converts the light out-coupling from the waveguide into an undistorted parallel ray image to output an undistorted image. In this case, the period of the output diffractive optical element can be described as follows:

$$T(\underline{R}, \underline{y}, n, \lambda) = \frac{\lambda/n}{\sin\left(\arcsin\left(\frac{\lambda}{nTo}\right) - \frac{\arcsin(y/R)}{2}\right)},$$

where R is a waveguide curvature,
n is a refractive index of the waveguide,
λ is a light wavelength,
y is a distance between the edge of the output diffractive optical element, nearest to the input diffractive optical element, and the projection of the point of the output diffractive optical element on the Y axis, wherein the output diffractive optical element follows the shape of the waveguide bending, and
T0 is the initial period of the output diffractive optical element.

Also, the period of the output diffractive optical element can be described as follows:

$$T(y) = \frac{\lambda/n}{\sin(\alpha) - \sin\left(\frac{y}{-R} - \beta\right)},$$

where α is an angle of light incidence on the waveguide surface,
β is an angle of direction of the diffracted light with the horizontal axis,
λ is a light wavelength,
R is a radius of curvature of the waveguide surface,
n is a refractive index of the waveguide material, and
y is a coordinate on the Y-axis of the curvilinear coordinate system directed along the curved waveguide with the origin at the point of beginning of the edge of the output diffractive optical element nearest to the input diffractive optical element.

The focal length of the input optical compensator is equal to the radius of curvature of the curved waveguide. The input optical compensator may be a lens. The input optical compensator can be a lens with spherical surfaces. Also, the input optical compensator can be a cylindrical lens. In yet another embodiment, the input optical compensator may be a lens with aspherical surfaces. The input optical compensator can be made as a liquid crystal lens. Also, the input optical compensator can be made on the basis of optical elements that bend the wavefront due to polarization effects. In one of the embodiments, the input optical compensator can be made as an adaptive optical element. The input diffractive optical element may have a constant grating period. In addition, the input optical compensator can be integrated into the input diffractive optical element in such a way that the input diffractive optical element will have a variable period of the diffraction grating, providing it with the optical power of the input optical compensator, wherein the optical power of the input diffractive optical element and the optical power due to curvature of the curved waveguide compensate each other. The output diffractive optical element can be made as volumetric Bragg gratings. In another embodiment, the output diffractive optical element can be made as a liquid crystal diffraction grating or a relief diffraction grating.

In accordance with another aspect of the disclosure, a method for operating said augmented reality device is provided. The method including projecting, by a projection system, an undistorted image in the form of parallel rays onto an input optical compensator, distorting an undistorted image by the input optical compensator, thus obtaining a pre-distorted image, wherein the parallel rays, after passing the input optical compensator, are converted into diverging rays, wherein the optical power of the input optical compensator is selected so that the curvature of the curved waveguide compensates for the divergence of the rays, inputting, by an input diffractive optical element, said pre-distorted image into the curved waveguide for propagation towards the output diffractive optical element, wherein the introduced pre-distortions being compensated by the curvature of the waveguide, converting the light out-coupled from the waveguide into parallel rays of the undistorted image by the output optical compensator of the output diffractive optical element by outputting an undistorted image from the augmented reality device.

In accordance with another aspect of the disclosure, augmented reality glasses are provided. The glasses include a frame in which a left eye element and a right eye element are fixed, wherein each of the elements for the left and right eyes representing the proposed augmented reality device. The projection system can be located in the temporal region of the user.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
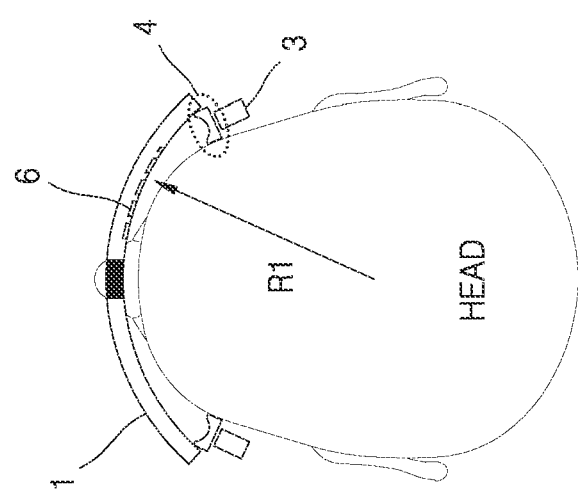
FIG. 1 schematically illustrates the outside view of the optical portion of the proposed augmented reality glasses according to an embodiment of the disclosure.
Figure 1:
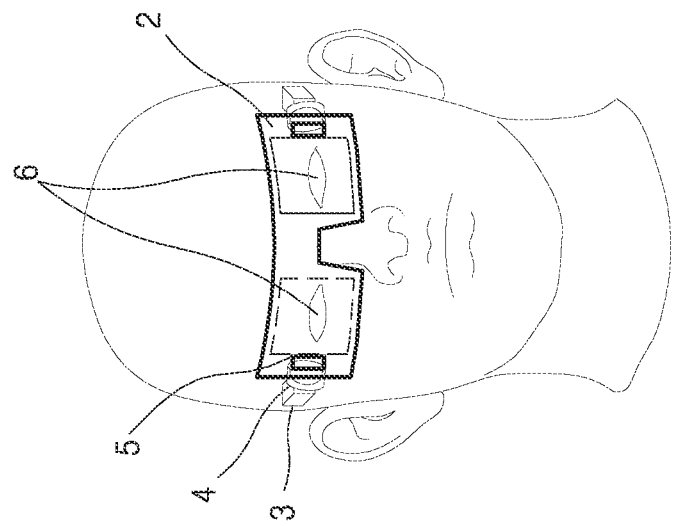

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An augmented reality device for augmented reality glasses based on a waveguide is proposed. The disclosure allows the user to see the image without distortion at any width of the light beam coming from a projection system. Also, the disclosure provides a wide field of view for the user and is a compact device. When using the proposed device, an improved image quality is provided, which is maintained at different eye distances from the waveguide.

The following terms are used in describing the disclosure:

A field of view (FOV) of an optical system (angular field) is a cone of rays coming out from the optical system and forming an image. The center of the field of view corresponds to the center of the image, and the edge of the field of view corresponds to the edge of the maximum possible image size.

An eye motion box (EMB) is an area within which the eye, while moving, can see the entire virtual image completely, without loss. The eye motion box is a linear region in space, inside which the entire field of vision enters an eye pupil, i.e. rays from any point of the image. Outside this region, part of the field of view is lost, i.e. outside this area there are no rays from any part of the image. The eye is constantly moving, rotating and at the same time the pupil of the eye is constantly shifting. The eye motion box should be large and should correspond to the field of view. The larger the field of view, the larger the eye motion box is.

The exit pupil (or the optical system pupil) is a paraxial image of the aperture diaphragm in image space, formed by the subsequent part of the optical system in the forward path of the rays. This term is well-established in optics. The main property of the exit pupil is that the entire field of the image exists at any point of it. When the exit pupil is multiplied, its size is increased without resorting to an increase in the longitudinal dimensions of the optical system. Classical optics allows increasing the size of the exit pupil, but the transverse dimensions of the optical system increase, while the waveguide optics provides this without increasing the transverse dimensions due to the multiple reflection of light beams inside the waveguide.

Diffraction efficiency is a property of a diffraction grating, measured as a percentage or fractions of a unit, the diffraction efficiency is the ratio of the energy contained in one of the diffraction orders relative to the energy incident on the diffraction grating.

A curved waveguide has a significant drawback: the curvature of the waveguide introduces distortions into the image, namely, it converts the plane wavefront of the light, that makes up the image, into a curved one. Moreover, the introduced distortions depend on the curvature of the waveguide: the greater the curvature, the greater the amount of distortion is. However, the amount of distortion can be eliminated by preliminary distortion (pre-distortion) of the image before the image is inputted into the curved waveguide. For this purpose, the proposed augmented reality device that displays a virtual image uses an input optical compensator. The input optical compensator pre-distorts the image to compensate for subsequent image distortion by the waveguide. Also, in the proposed device, the output diffractive element additionally includes an optical compensator, the function of which is to compensate for image distortions in a curved waveguide when the light is out-coupled from the waveguide. The input optical compensator and the output optical compensator can be deposited directly on the waveguide.

The combination of the input and output compensators works in such a way that all rays that enter the waveguide from the projection system will come out of the device parallel to each other. This effect will be both for a narrow light beam and for a wide light beam out-coupled from the projection system.

FIG. 1 schematically illustrates the outside view of the augmented reality glasses according to an embodiment of the disclosure. Referring to FIG. 1, augmented reality glasses are a curved transparent waveguide 1, enclosed in a frame 2. In the temporal region of the user, on each side of the head on the frame, there is a projection system 3, behind the projection system 3, that is, in the path of the light rays out-coupled from the projection system, there is an input optical compensator 4, further an input diffractive optical element 5 is on the waveguide 1, an output diffractive optical element 6, which has a variable grating period and is an output optical compensator, is located on the waveguide 1 opposite the user's eyes.

Figure 2A:
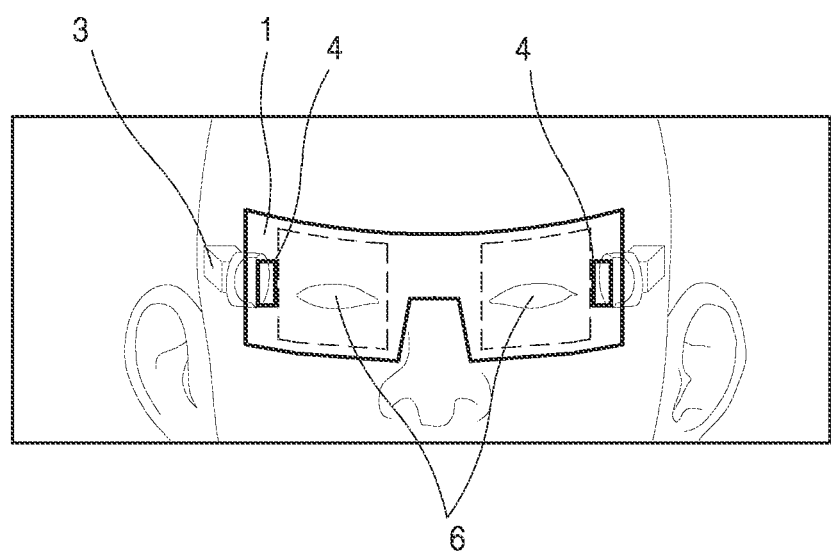
FIG. 2A illustrates the outside view of augmented reality glasses worn by a user according to an embodiment of the disclosure.
Figure 2B:
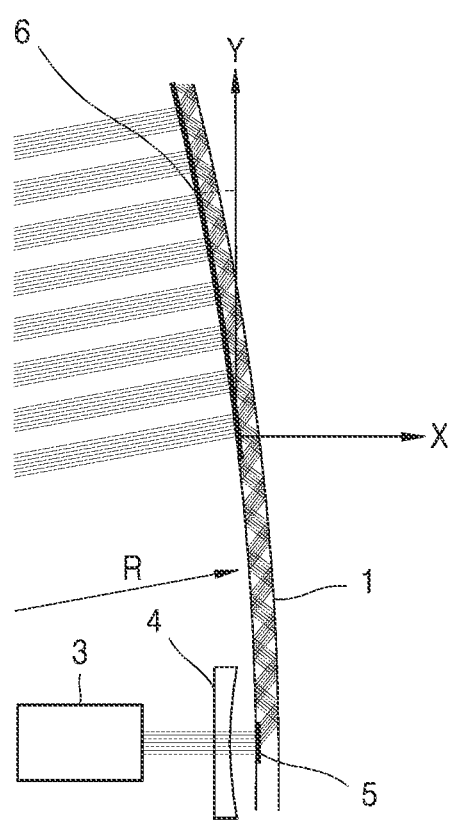
FIG. 2B schematically illustrates an augmented reality display device according to an embodiment of the disclosure.

FIG. 2A schematically illustrates augmented reality glasses worn by a user according to an embodiment of the disclosure, and FIG. 2B schematically shows an augmented reality device used in augmented reality glasses according to an embodiment of the disclosure.

The augmented reality device that displays a virtual image comprises:

Referring to FIGS. 2A and 2B, a projection system 3 projecting an image to infinity, i.e., the rays out-coupled from it are parallel, a curved waveguide 1 comprising an input diffractive optical element 5 for inputting an image into a curved waveguide 1 via diffraction, and an output diffractive optical element 6 for outputting an image from the waveguide, for example, to the user's eye. The input light rays propagate along the waveguide 1 from the input diffractive optical element 5 to the output diffractive optical element 6 by total internal reflection (TIR) from the surfaces inside the waveguide. The device also comprises an input optical compensator 4 configured to provide an image pre-distortion opposite to the distortion introduced due to the curvature of the waveguide 1. The pre-distorted image falls on the input diffractive optical element 5. The image propagates along the waveguide 1 from the input diffractive optical element 5 to the output diffractive optical element 6 by total internal reflection (TIR) from the surfaces of the waveguide 1. The output diffractive optical element 6 is made with a variable period of the diffraction grating and performs the function of an output optical compensator. For the image not to have any distortion, the rays passing through the waveguide, should exit the waveguide parallel to each other. Since the input optical compensator 4 cannot be responsible for the parallelism of the rays at the output of the waveguide 1, the output diffractive optical element 6 converts the beams of rays at the output of the waveguide into parallel beams that form an image and enter the user's eye. When light is out-coupled from the waveguide due to diffraction on the output diffractive optical element due to the variable period all subsequent beams will exit the curved waveguide parallel to each other in image space.

Thus, at the output of the output optical compensator, an image is obtained that does not have aberrations and distortions in the form of doubling.

The amount of changes in the period of the diffraction grating of the output optical compensator is a function of the radius of curvature of the waveguide. Referring to FIG. 2B, it shows a coordinate system the origin of which is associated with the beginning of the output diffractive optical element, which is also the output optical compensator. The period of the diffraction grating of the output diffractive optical element depends on the Y coordinate, that is, in one of the embodiments, on the distance from the edge of the output diffractive optical element to any point of the output diffractive optical element, the radius of curvature of the waveguide, the refractive index of the waveguide and the wavelength of light passing through waveguide.

Figure 3A:
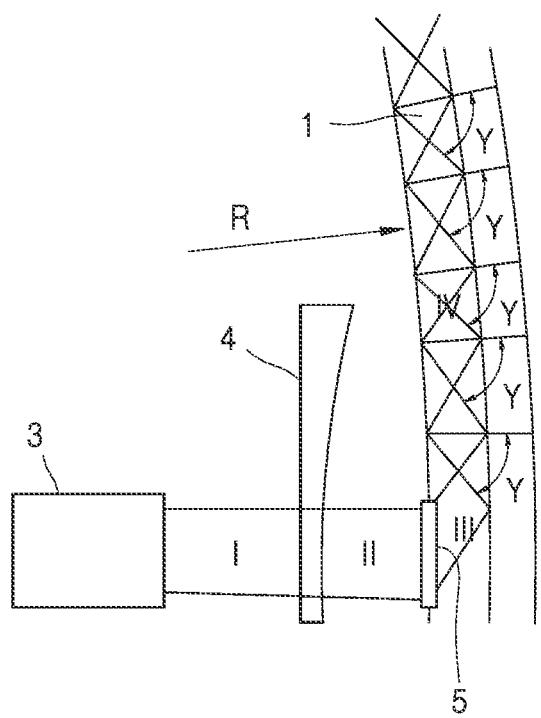
FIG. 3A illustrates the input portion of the augmented reality display device according to an embodiment of the disclosure.
Figure 3B:
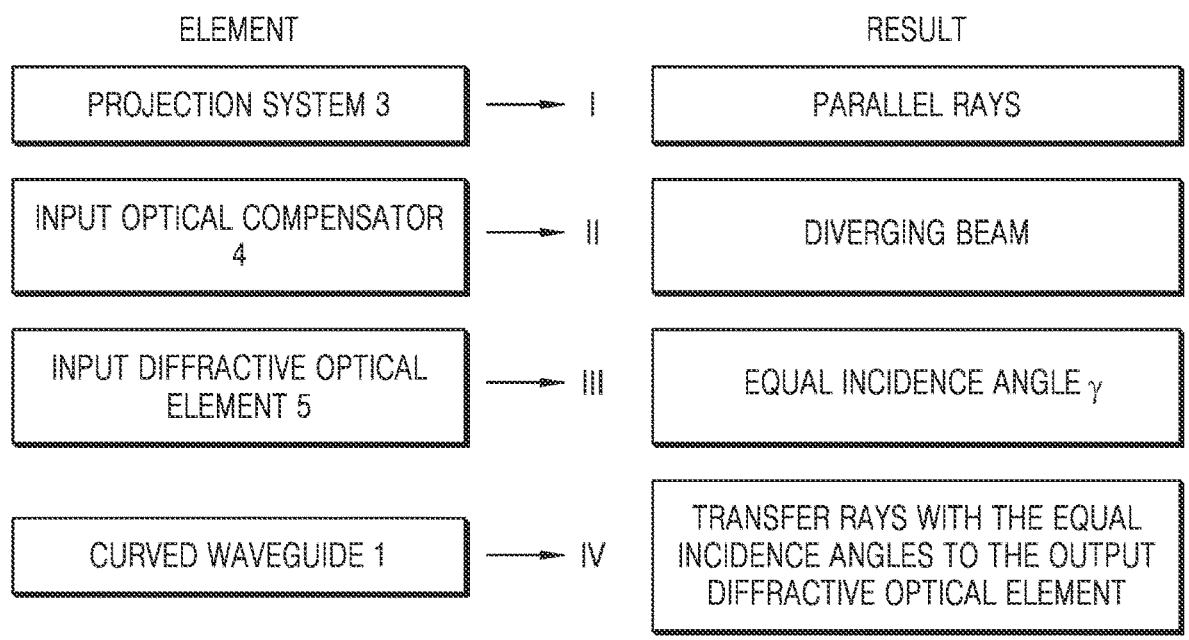
FIG. 3B shows a flowchart of the input portion of the augmented reality display device according to an embodiment of the disclosure.

FIG. 3A illustrates an input portion of the augmented reality device displaying a virtual image according to an embodiment of the disclosure, FIG. 3B illustrates a flowchart of the input portion of the augmented reality device according to an embodiment of the disclosure. Referring to FIGS. 3A and 3B, a beam leaving I from the projection system 3 is a plurality of parallel rays, this beam of parallel rays enters the input optical compensator 4, being a lens, passing through which the beam is converted II into a divergent beam, all the rays of which diverge at different angles relative to the optical axis. The diverging beam hits the input diffractive optical element 5. The optical power of the input optical compensator 4 is selected so that the curvature of the waveguide 1 compensates for the beam divergence. Optical power characterizes the refractive power of an optical element, that is, the degree of deflection of rays by it. The input optical compensator shall have such a degree of ray deflection (that is, such a refractive index and the focal length of the input compensator are selected) at which the parallel beam will diverge after the input optical compensator so that when it enters the curved waveguide, the beam will again become parallel. That is, after passing III the input optical compensator and diffraction on the input diffractive optical element 5 inside the waveguide, all the rays propagate in such a way that, falling on any point of any of the surfaces of the waveguide 1, they form the same angle of incidence γ and propagate IV towards the output diffractive optical element 6. Feature of the input optical compensator 4 is that it has such an optical power that ensures that all the rays inside the waveguide fall on the surface of the waveguide at one angle. This property of the optical compensator is necessary to ensure creation and correct operation of the output optical compensator with a variable grating period.

This can be realized if the focal length f of the input optical compensator 4 is equal to the radius of curvature R of the curved waveguide (focal length of the input compensator f=−R). If an ordinary diffraction grating with a constant period is used at the output of the waveguide, then all the rays emerging from the waveguide 1 will converge at the center of curvature of the curved surface of the waveguide. To compensate for the effect of convergence of rays emerging from the waveguide, it is necessary to use an output diffractive optical element 6 with a variable period at the curved waveguide output.

The input optical compensator 4 can be a glass or plastic lens with spherical or aspherical surfaces, or a cylindrical lens, depending on the shape of the waveguide, that is, the shape of the input optical compensator 4 shall correspond to the curvature of the waveguide 1. The input optical compensator can be made as a liquid crystal lens. Also, the input optical compensator can be made on the basis of optical elements that bend the wavefront due to polarization effects. The input optical compensator may be made as an adaptive optical element, the shape of which can be controlled to change the wavefront of the light constituting the image.

In various embodiments of the disclosure, the input diffractive optical element may have both a constant grating period and a variable grating period. If the input optical compensator is not combined with the input diffractive optical element (if they are not integrated), then the diffraction grating of the input diffractive optical element shall have a constant period. In one embodiment, the input optical compensator can be integrated into the input diffractive optical element, i.e. the optical compensator and the diffractive optical element are one element that performs the functions of both the optical compensator and the diffractive optical element. In this case, the input diffractive optical element has a variable period of the diffraction grating, which provides it with the optical power of the input optical compensator. In this case, the optical power of the input diffractive optical element and the optical power of the curved waveguide compensate each other. All embodiments provide weight reduction, size reduction, improved efficiency of the device.

Figure 4:
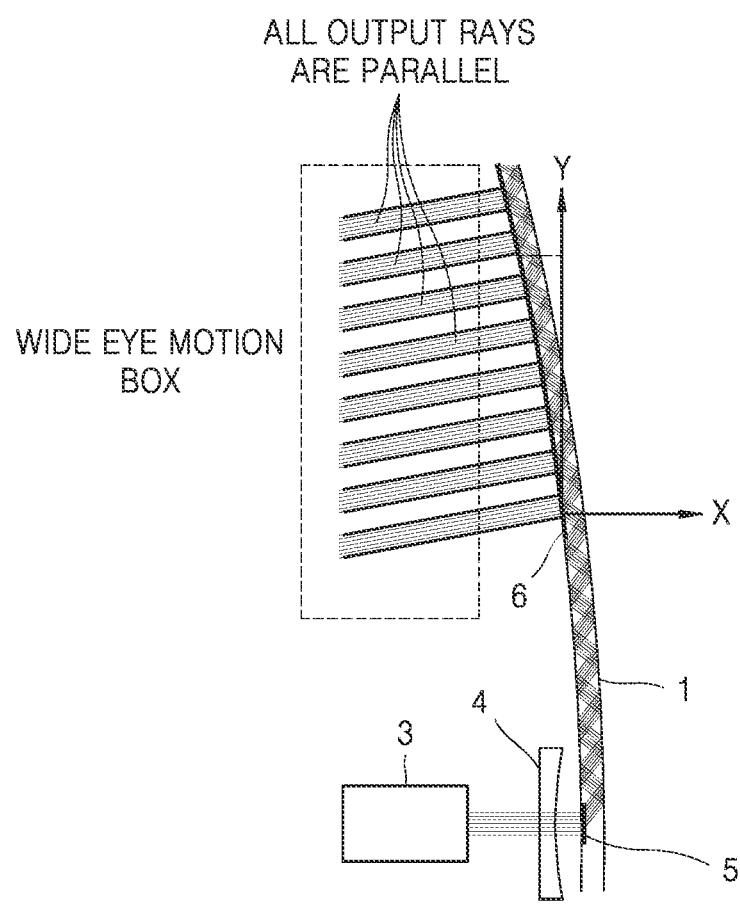
FIG. 4 illustrates an output portion of the augmented reality display device according to an embodiment of the disclosure.

FIG. 4 illustrates the output portion of the augmented reality device according to an embodiment of the disclosure. Referring to FIG. 4, output diffractive optical element 6, in addition to the function of out-coupling of light from the waveguide, also performs the function of an optical compensator, and allows all light beams that have passed through the waveguide to be out-coupled, not only ensuring the parallelism of the rays inside each beam, but also ensuring the parallelism of the light beams among themselves. The grating period of the output diffractive optical element depends on the radius of curvature of the waveguide, on a refractive index of the waveguide material, and on a light wavelength.

The dependences of the period T of the output diffractive optical element on the radius R of the curvature of the waveguide, the refractive index n of the waveguide, the light wavelength λ and the distance y from the beginning of the compensator along the Y axis are analytically derived, where y is a distance between the edge of the output diffractive optical element, nearest to the input diffractive optical element, and the projection of the point of the output diffractive optical element on the Y axis, wherein the output diffractive optical element follows the shape of the bend of the waveguide. In one embodiment, the variable period of the output diffractive optical element is determined as follows:

$$T(R, y, n, \lambda) = \frac{\lambda/n}{\sin\left(\arcsin\left(\frac{\lambda}{nT_0}\right) - \frac{\arcsin(y/R)}{2}\right)}, \quad \text{Equation 1}$$

T0 is a period of the diffraction grating at the beginning point of the output diffractive optical element along the y axis—the nearest point to the input diffractive optical element, is determined by the designer, basing on the requirements for a specific device and waveguide architecture. The period T0 determines the output direction of the rays emerging from the waveguide.

Figure 5:
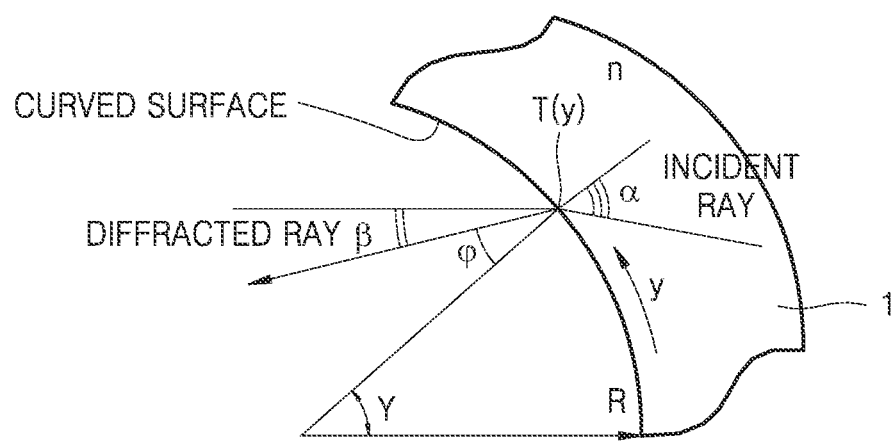
FIG. 5 illustrates a ray diffraction when light is incident on the output diffractive optical element and the light out-coupled from a curved waveguide according to an embodiment of the disclosure.

In another embodiment, the period of the output diffractive optical element can be determined in a cylindrical coordinate system as follows:

$$T(y) = \frac{\lambda/n}{\sin(\alpha) - \sin\left(\frac{y}{-R} - \beta\right)}, \quad \text{Equation 2}$$

where α is an angle of light incidence on the waveguide surface, β is an angle of direction of the diffracted light with the horizontal axis, λ is a light wavelength, R is a radius of curvature of the waveguide surface, n is a refractive index of the waveguide material, y is a coordinate on the Y axis of the curvilinear coordinate system directed along the curved waveguide (along the arc, as seen in FIG. 5) with the origin at the point of beginning of the edge of the output diffractive optical element nearest to the input diffractive optical element.

FIG. 5 illustrates the distribution of angles when light is incident on the output diffractive optical element and when light is out-coupled from the curved waveguide according to an embodiment of the disclosure. The curved waveguide is shown by reference numeral 1 in FIG. 5, where φ is a diffraction angle, γ is an angle between the horizontal axis and a point with coordinate y on the waveguide surface with a vertex at the center of curvature of the waveguide surface.

Referring to FIG. 5, since the input optical compensator ensures the passage of light beams in the waveguide at the same angles of incidence on the waveguide surface, then, if the output optical compensator with a variable grating period is not used, the light beams leaving the waveguide will converge at one point of the waveguide due to the curvature of the waveguide. The variable period of the output diffractive optical element, which also performs the function of an output optical compensator, calculated by formulas (1) or (2), allows the light to be out-coupled from the device at such angles that, as a result, all the out-coupled rays of one beam are parallel to each other. This leads to the elimination of aberrations, elimination of distortions, elimination of ghost images. A wide eye motion box is also provided, which is provided only by the dimensions of the waveguide, that is, it is possible to use a waveguide of any length, on the surface of which an output diffractive optical element is recorded, which also performs the function of an output optical compensator, and parallel light will be out-coupled from any point of the output diffractive optical element. An additional advantage is that the eye can be located at a sufficient distance from the surface of the waveguide, wherein the image will be seen without distortion.

Figure 6A:
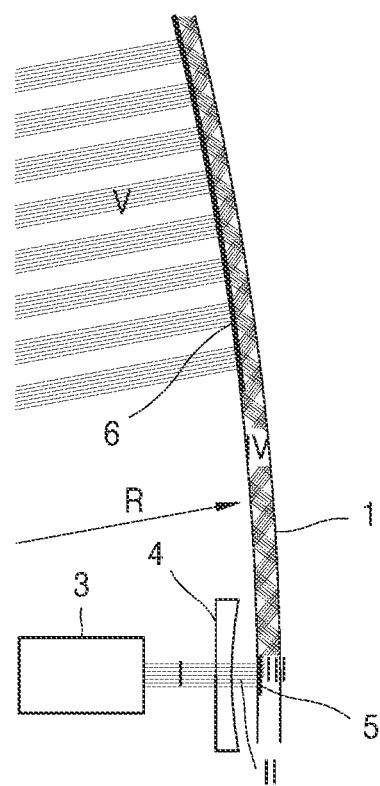
FIG. 6A illustrates an augmented reality display device according to an embodiment of the disclosure.
Figure 6B:
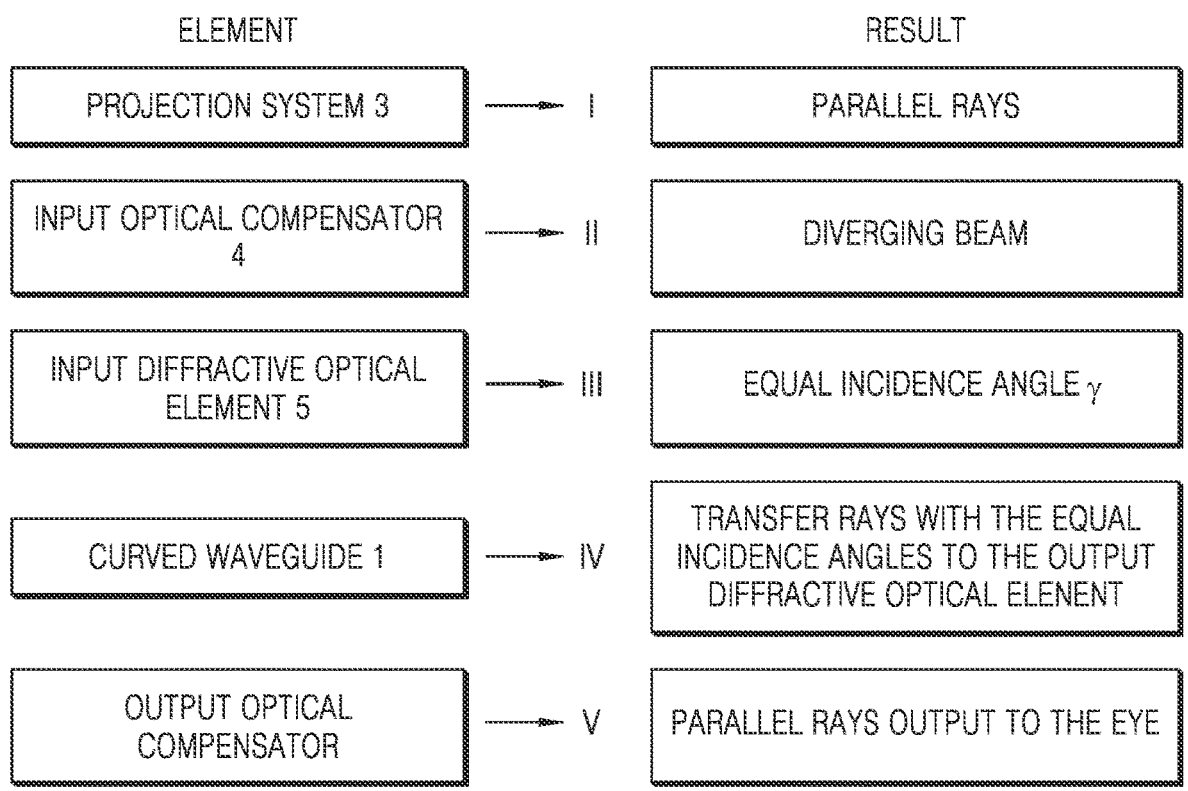
FIG. 6B shows a flowchart of the augmented reality device displaying a virtual image according to an embodiment of the disclosure.

FIG. 6A illustrates an augmented reality device according to an embodiment of the disclosure, FIG. 6B shows a flowchart of the augmented reality device according to an embodiment of the disclosure.

Referring to FIGS. 6A and 6B, parallel light beams coming out I of a projection system 3 enter an input optical compensator 4. Passing the input optical compensator, the beams are converted II into divergent beams. The divergent light enters the input diffractive optical element 5. After passing III the input optical compensator 4 and diffraction on the input diffractive optical element 5 inside the waveguide, all rays propagate in such a way that, falling on any point on the surface of the waveguide 1, they form the same angle of incidence γ and spread IV towards the output diffractive optical element 6 having a variable period. Due to diffraction at the output diffractive optical element 6, the light is out-coupled V from the waveguide, and the output diffractive optical element 6 also performs the function of an output optical compensator in such a way that all the rays that make up the image are out-coupled parallel to each other.

The output diffractive optical element 6, which also acts as an output optical compensator, can be made on the basis of volumetric Bragg gratings. In another embodiment, the output diffractive optical element 6 may be a liquid crystal diffraction grating. The output diffractive optical element can be relief-phase diffractive optical elements (DOE).

Figure 7:
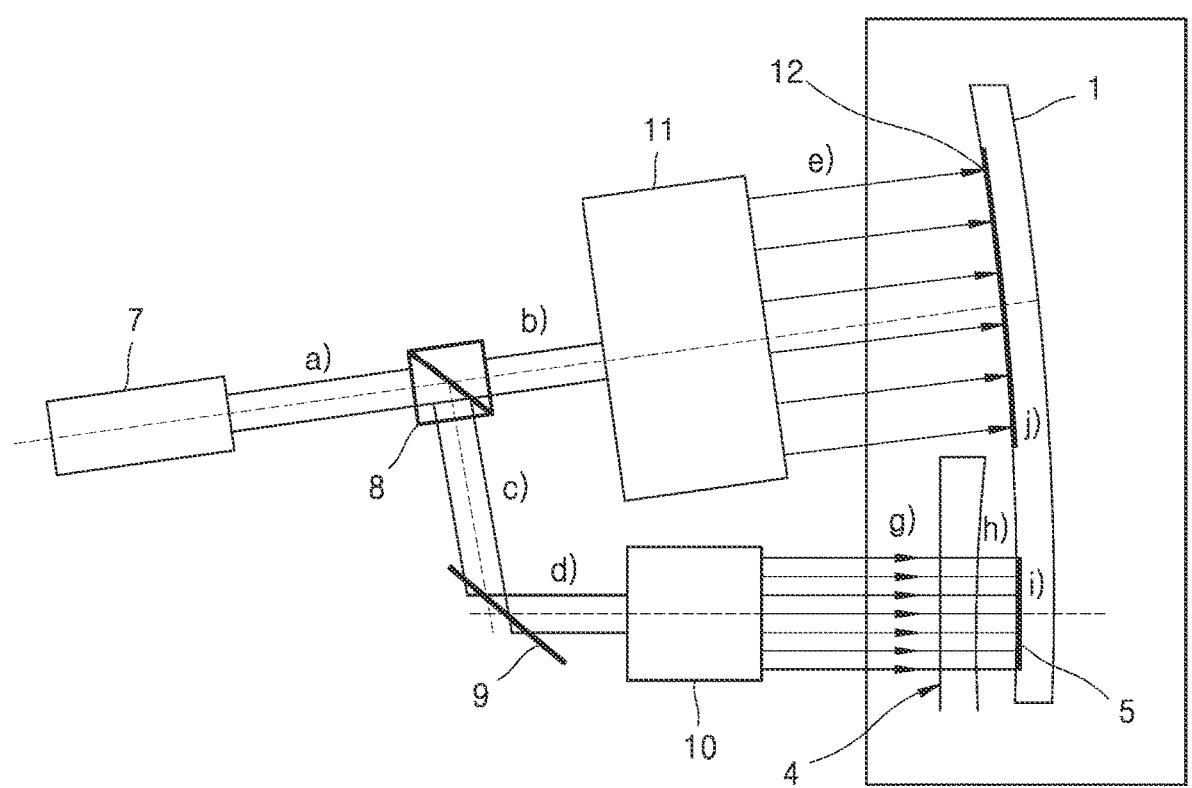
FIG. 7 schematically illustrates a device with which the output diffractive optical element is recorded onto the waveguide according to an embodiment of the disclosure.

FIG. 7 schematically illustrates a device with which the output diffractive optical element is formed on a curved waveguide according to an embodiment of the disclosure.

The formation (recording) of the output diffractive optical element can be performed at the last stage of manufacturing the augmented reality device.

Referring to FIG. 7, when recording (forming) an output diffractive optical element on a waveguide 1 comprising an input diffractive optical element 5, the light (a) from a coherent light source 7, for example, a laser, falls on a beam splitter 8, which divides the beam from the laser (e.g., coherent light source 7) into two beams—the object beam (b) and the reference beam (c), the reference beam enters the mirror 9, and then (d) into the first expander (10), the object beam enters the second expander 11. The object beam, having passed (e) the expander, which forms the desired beam size, determined by calculations of a particular device and the parameters of its constituent elements, falls on the output part of the waveguide in the region where the output diffractive optical element should be located, wherein a photosensitive material 12 is applied to the waveguide in this area. After expansion, the reference beam falls (g) on the input optical compensator 4, which introduces pre-emphasis into the reference beam, the reference beam becomes divergent. Next, the reference beam falls (h) on the input diffractive optical element 5, and, due to diffraction on the input diffractive optical element, falls (i) into the waveguide. The reference beam propagates (j) along the waveguide 1 due to total internal reflection from the surfaces of the waveguide and enters the area of the photosensitive material 12. Since the reference beam and the object beam come from the same coherent light source 7, in the area of the photosensitive material 12, the reference beam and the object beam are superimposed on each other, wherein an interference pattern is created in the photosensitive material 12. Since the interference pattern is recorded not on a straight waveguide, but on a curved waveguide, the interference pattern obtained on the photosensitive element 12 has interference fringes located at different distances from each other, therefore, the resulting output diffractive optical element has a variable period along the length of the output diffractive optical element, due to which the function of the output optical compensator will be implemented.

Figure 8:
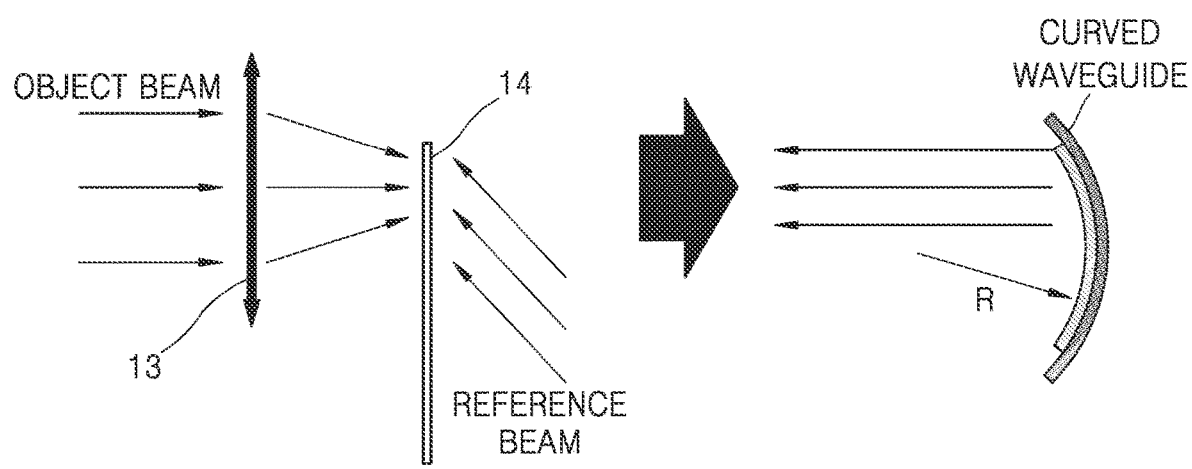
FIG. 8 schematically illustrates the recording of the output diffractive optical element on a flat waveguide according to an embodiment of the disclosure.

FIG. 8 schematically illustrates the recording of an output diffractive optical element on a planar waveguide according to an embodiment of the disclosure.

Referring to FIG. 8, reference and object beams are used to record the output diffractive optical element. The parallel object beam passes through the positive optical element 13, becomes convergent and hits the photosensitive material deposited on one side of the transparent substrate 14, wherein the reference beam falls on the other side of the transparent substrate and hits the photosensitive material, and is parallel. When the reference and object beams interfere, an output diffractive optical element with a variable period will be formed. Since the rays in a converging beam are not parallel and propagate at different angles, when such a wavefront meets a plane wavefront in which the beams are parallel, the resulting interference pattern has a variable period. By varying the focal length of the positive optical element 13, it is possible to vary the change in the period of the obtained output diffractive optical element, the focal length of the positive optical element 13 shall be equal to the radius of the curved waveguide on which the diffractive optical element will be attached (deposited). The output diffractive optical element thus formed is attached (applied to) to a curved waveguide. Various methods of forming a diffractive optical element with a variable period are not the subject of disclosure.

During operation of the augmented reality device, the parallelism of the beams of rays is restored. Since the object beam is a beam of parallel rays, then, according to the laws of recording and creating holograms, when the waveguide is illuminated by parallel beams of light from the projection system, a light beam from the projector will propagate in the waveguide, similar to the reference beam, which will fall on the formed output diffraction grating and, by diffracting on the output diffraction grating, will form a beam similar to the object beam, i.e. also parallel.

The propagation of light from the projection system will be similar to the propagation of the reference beam, the light will exit the waveguide in the region of the output diffractive optical element in parallel, similar to how the object beam was coupled into the waveguide when the recording the input diffractive optical element took place. Thus, the recorded output diffractive optical element will have such a variable grating period of the output diffractive optical element that a parallel light beam constituting the image will exit the waveguide, and the image will be reproduced without distortion. That is, with this method of forming the output diffractive optical element, the degree of curvature of the waveguide is taken into account automatically.

A transparent photopolymer can be used as a photosensitive material. A volumetric Bragg grating is created in the photopolymer layer, which does not require post-processing; after irradiation of the photopolymer, volumetric Bragg gratings are immediately ready for use.

A photoresist can be used as a light-sensitive material; after irradiation of such a material, an etching operation may be performed. After etching, a relief diffraction grating is formed. Such diffraction gratings have higher efficiency and higher image quality.

A photoorientant can be used as a light-sensitive material to create a diffraction grating based on liquid crystals. When the photoorientant is irradiated, the liquid crystal molecules line up in accordance with the interference pattern obtained by one of the above methods, then additional surface treatment may be performed, which consists in the fact that at least one layer of liquid crystals will need to be applied to the photooriented layer, wherein the liquid crystal molecules will be oriented in accordance with the photoorientant molecules and will create a diffraction grating. A relief output grating is formed on the convex surface of a curved waveguide and can be used as a relief grating "master" to create a grating on the concave sides of curved waveguides.

Alternatively, a relief diffraction grating can be created on the convex surface of the waveguide, then a hologram of the output diffractive optical element is formed using the imprint.

The period of the output diffractive optical element can be made. Using such a diffractive optical element, one can zoom in or out the image.

Due to the use of an input optical compensator and an output optical compensator with a variable period of the output diffractive optical element, doubling of the resulting image is eliminated due to the parallelism of the light beams emerging from the waveguide.

The proposed disclosure, when used in augmented reality devices, due to the wide field of view, provides an exciting presence effect—the user feels himself inside virtual reality, whether it is a game, a movie or a simulator.

Realistic presence is provided because the user can see the details of almost the real world. The proposed disclosure can be used in any augmented and virtual reality (AR/VR), head-up display (HUD), helmet-mounted display (HMD) devices, where it is necessary to have a high-resolution image and a wide field of view.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An augmented reality device, the augmented reality device comprising:
    a projection system;

an input optical compensator located on a path of light rays out-coupled from the projection system; and a curved waveguide comprising an input diffractive optical element and an output diffractive optical element, wherein the projection system is configured to project an undistorted image as parallel light rays onto the input optical compensator, wherein the input optical compensator is configured to pre-distort the image obtained from the projection system, wherein the image pre-distortion is opposite to a distortion introduced by a curved waveguide into an undistorted image, wherein the input diffractive optical element is configured to input, into the curved waveguide, an image with a pre-distortion opposite to the distortion introduced by the curved waveguide, wherein the output diffractive optical element is configured with a variable period of a diffraction grating and performs a function of an output optical compensator that converts light out-coupling from the curved waveguide into an undistorted parallel ray image to output an undistorted image, and wherein the input optical compensator is integrated into the input diffractive optical element such that the input diffractive optical element has a variable period of the diffraction grating and is provided with optical power of the input optical compensator.

2. The augmented reality device of claim 1, wherein the variable period of the output diffractive optical element is described as follows:

$$T(\underline{R}, y, n, \lambda) = \frac{\lambda/n}{\sin\left(\arcsin\left(\frac{\lambda}{nT_0}\right) - \frac{\arcsin(y/R)}{2}\right)},$$

where R is a waveguide curvature,
n is a refractive index of the waveguide,
λ is a light wavelength,
y is a distance between an edge of the output diffractive optical element, nearest to the input diffractive optical element, and a projection of a point of the output diffractive optical element on a Y axis, wherein the output diffractive optical element follows a shape of the waveguide bending, and
T0 is an initial period of the output diffractive optical element.

3. The augmented reality device of claim 1, wherein the variable period of the output diffractive optical element is described as follows:

$$T(y) = \frac{\lambda/n}{\sin(\alpha) - \sin\left(\frac{y}{-R} - \beta\right)},$$

where α is an angle of light incidence on a surface of a waveguide,
β is an angle of direction of diffracted light with a horizontal axis,
λ is a light wavelength,
R is a radius of curvature of a surface of the waveguide,
n is a refractive index of a material of the waveguide, and
y is a coordinate on a Y-axis of a curvilinear coordinate system directed along the curved waveguide with an origin at a point of beginning of an edge of the output diffractive optical element nearest to the input diffractive optical element.

4. The augmented reality device of claim 1, wherein the input optical compensator comprises a lens.

5. The augmented reality device of claim 1, wherein a focal length of the input optical compensator is equal to a radius of curvature of the curved waveguide.

6. The augmented reality device of claim 1, wherein the input optical compensator comprises a lens with spherical surfaces.

7. The augmented reality device of claim 1, wherein the input optical compensator comprises a cylindrical lens.

8. The augmented reality device of claim 1, wherein the input optical compensator comprises a lens with aspherical surfaces.

9. The augmented reality device of claim 1, wherein the input optical compensator is made as a liquid crystal lens.

10. The augmented reality device of claim 1, wherein the input optical compensator is made on a basis of optical elements that bend a wavefront due to polarization effects.

11. The augmented reality device of claim 1, wherein the input optical compensator is made as an adaptive optical element.

12. The augmented reality device of claim 1, wherein the input diffractive optical element has a constant grating period.

13. The augmented reality device of claim 1,
wherein the optical power of the input diffractive optical element and the optical power, due to curvature of the curved waveguide, compensate each other.

14. The augmented reality device of claim 1, wherein the output diffractive optical element is made as volumetric Bragg gratings.

15. The augmented reality device of claim 1, wherein the output diffractive optical element is made as a liquid crystal diffraction grating or a relief diffraction grating.

16. A method for operating an augmented reality device, the method comprising:
projecting, by a projection system, an undistorted image in a form of parallel rays onto an input optical compensator;
distorting an undistorted image by the input optical compensator, thus obtaining a pre-distorted image, wherein the parallel rays, after passing the input optical compensator, are converted into diverging rays, wherein optical power of the input optical compensator is selected so that a curvature of a curved waveguide compensates for the divergence of the rays;
inputting, by an input diffractive optical element, the pre-distorted image into the curved waveguide for propagation towards an output diffractive optical element, wherein introduced pre-distortions being compensated by the curvature of the curved waveguide; and
converting light out-coupled from the curved waveguide into parallel rays of the undistorted image by an output optical compensator of the output diffractive optical element by outputting an undistorted image from the augmented reality device, and
wherein the input optical compensator is integrated into the input diffractive optical element such that the input diffractive optical element has a variable period of a diffraction grating and is provided with optical power of the input optical compensator.

17. Augmented reality glasses, comprising:
a frame in which a left eye element and a right eye element are fixed, wherein each of the left eye element and the right eye element comprise:

a projection system;

an input optical compensator located on a path of light rays out-coupled from the projection system; and a curved waveguide comprising an input diffractive optical element and an output diffractive optical element, wherein the projection system is configured to project an undistorted image as parallel light rays onto the input optical compensator, wherein the input optical compensator is configured to pre-distort the image obtained from the projection system, wherein the image pre-distortion is opposite to a distortion introduced by a curved waveguide into an undistorted image, wherein the input diffractive optical element is configured to input, into the curved waveguide, an image with a pre-distortion opposite to the distortion introduced by the curved waveguide, wherein the output diffractive optical element is configured with a variable period of a diffraction grating and performs a function of an output optical compensator that converts light out-coupling from the curved waveguide into an undistorted parallel ray image to output an undistorted image, and wherein the input optical compensator is integrated into the input diffractive optical element such that the input diffractive optical element has a variable period of the diffraction grating and is provided with optical power of the input optical compensator.

18. The augmented reality glasses of claim 17, wherein the projection system is located in a temporal region of a user.

* * * * *